Nov. 30, 1948.  J. B. ANDERSON  2,455,209
APPARATUS FOR DISSEMINATING WEATHER INFORMATION
Filed May 26, 1947  5 Sheets-Sheet 1
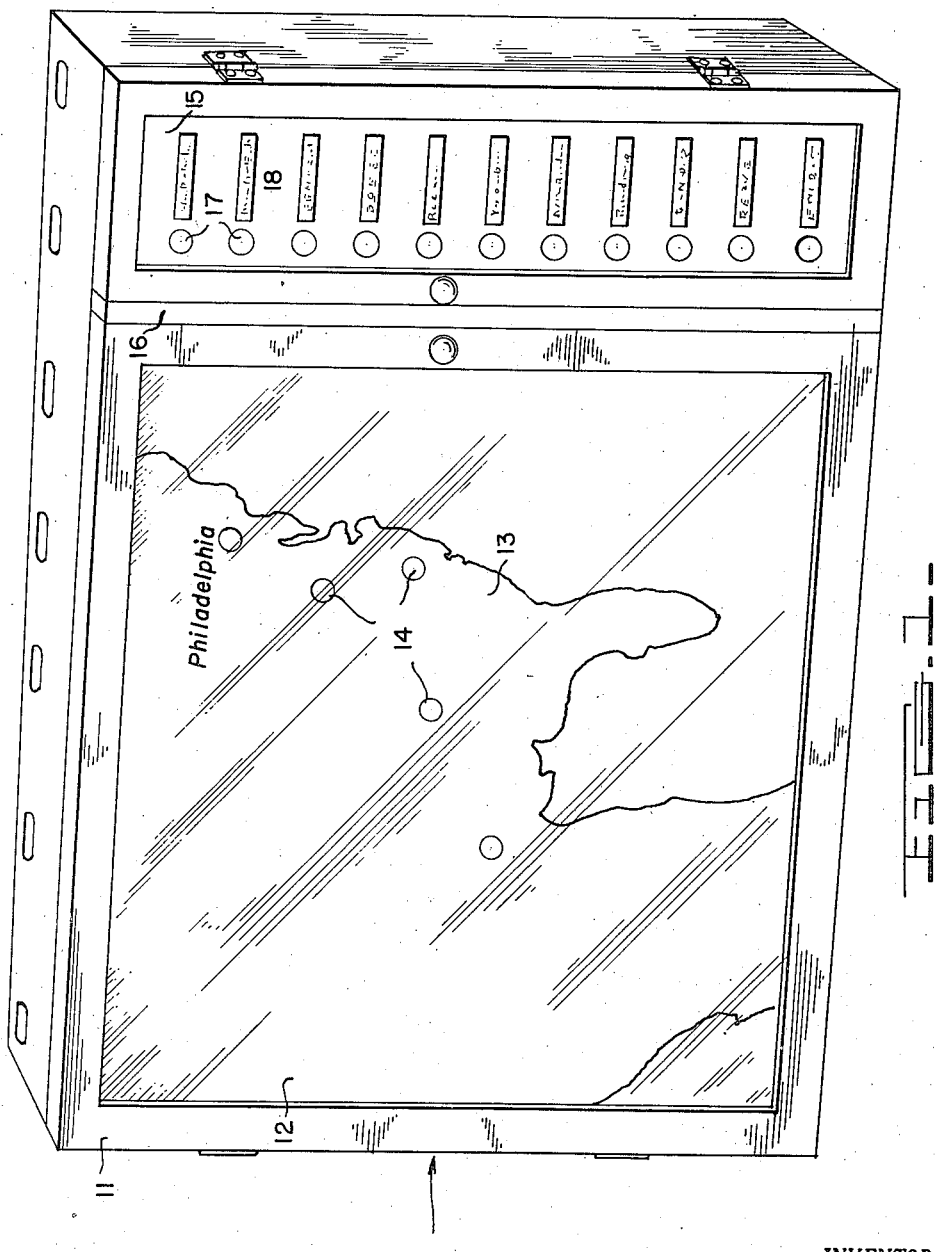
INVENTOR.
Joseph B. Anderson
BY Adams & Bush
Attorney's

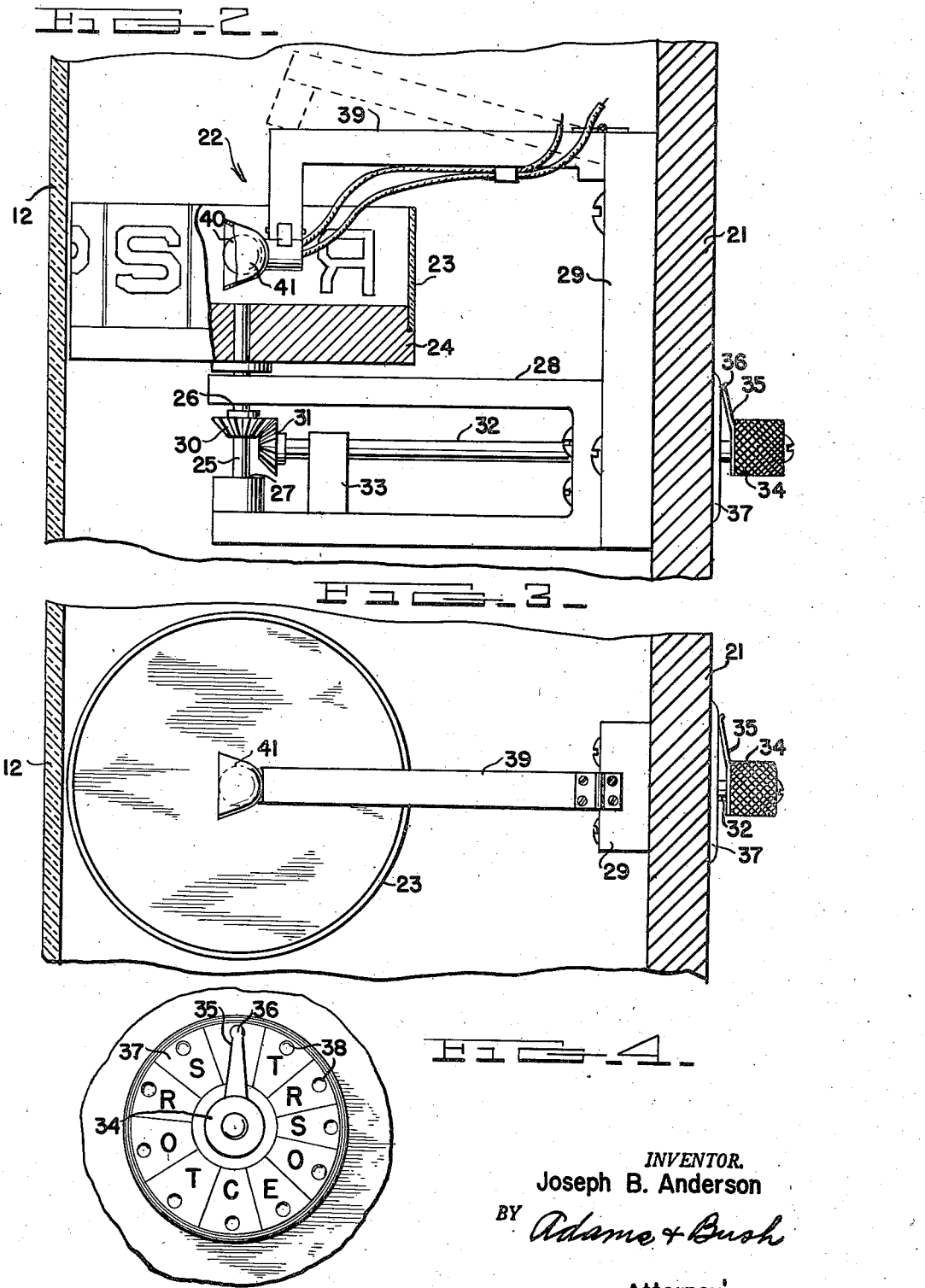

Nov. 30, 1948.    J. B. ANDERSON    2,455,209
APPARATUS FOR DISSEMINATING WEATHER INFORMATION
Filed May 26, 1947    5 Sheets-Sheet 3
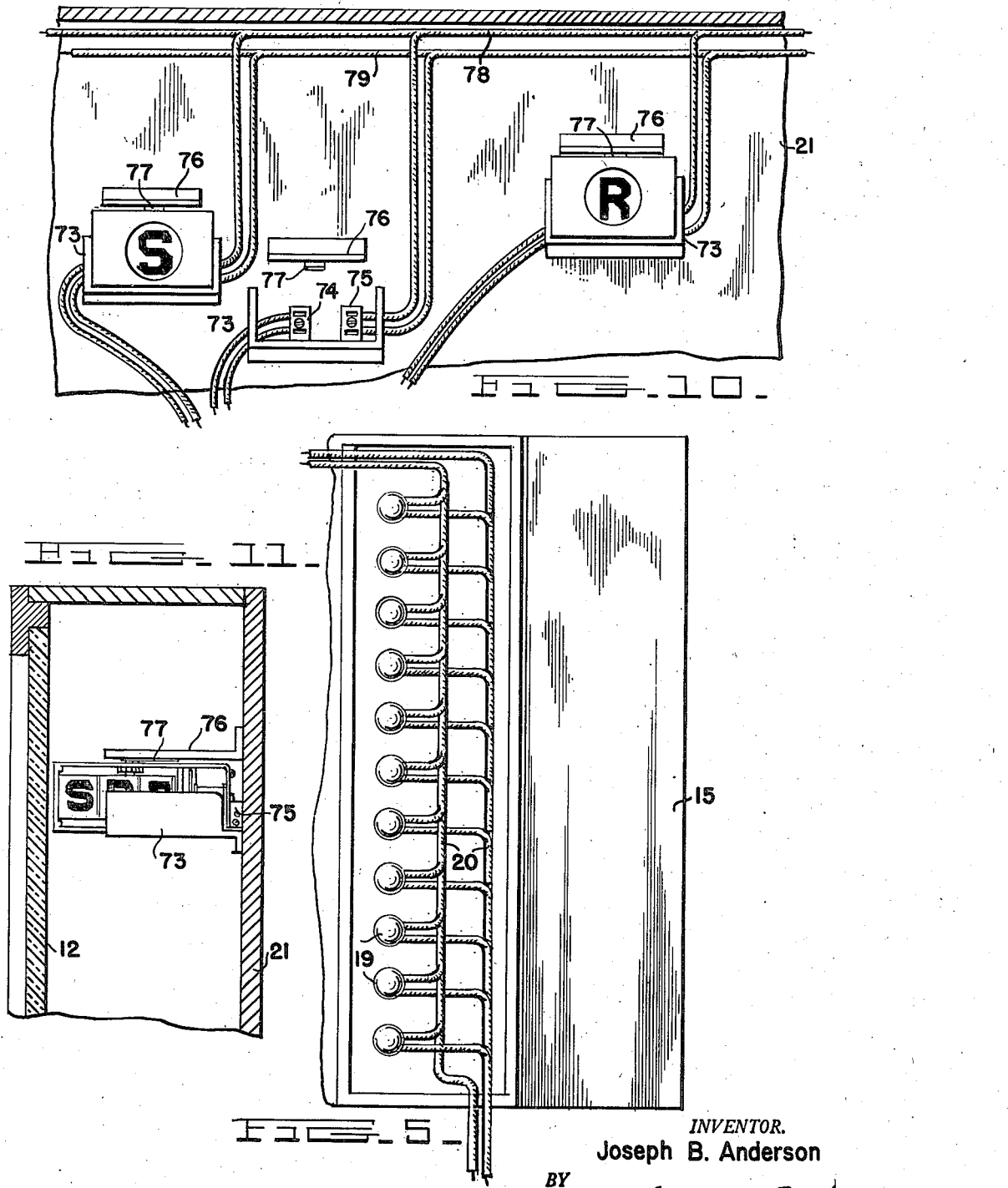
INVENTOR.
Joseph B. Anderson
BY
Attorney's

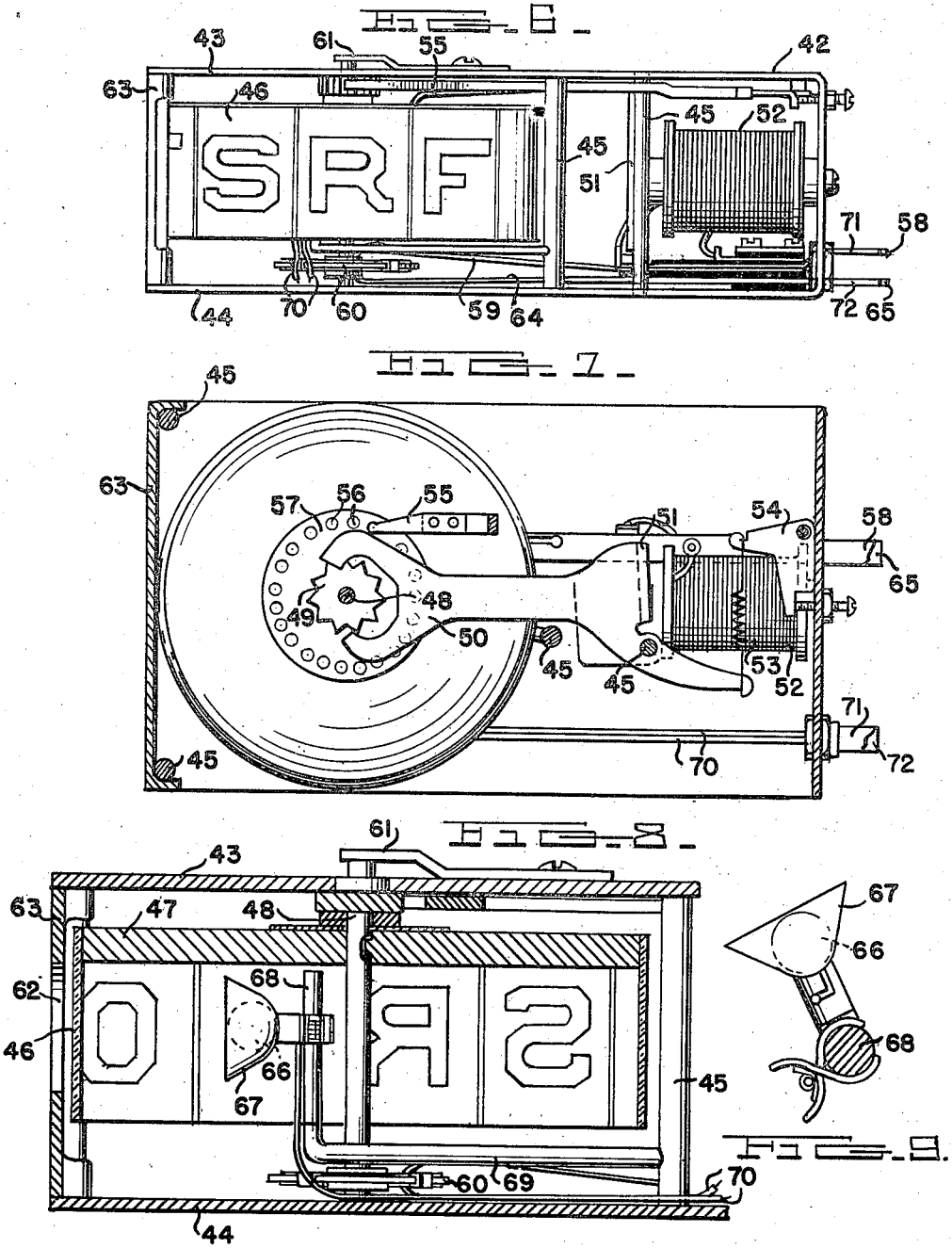

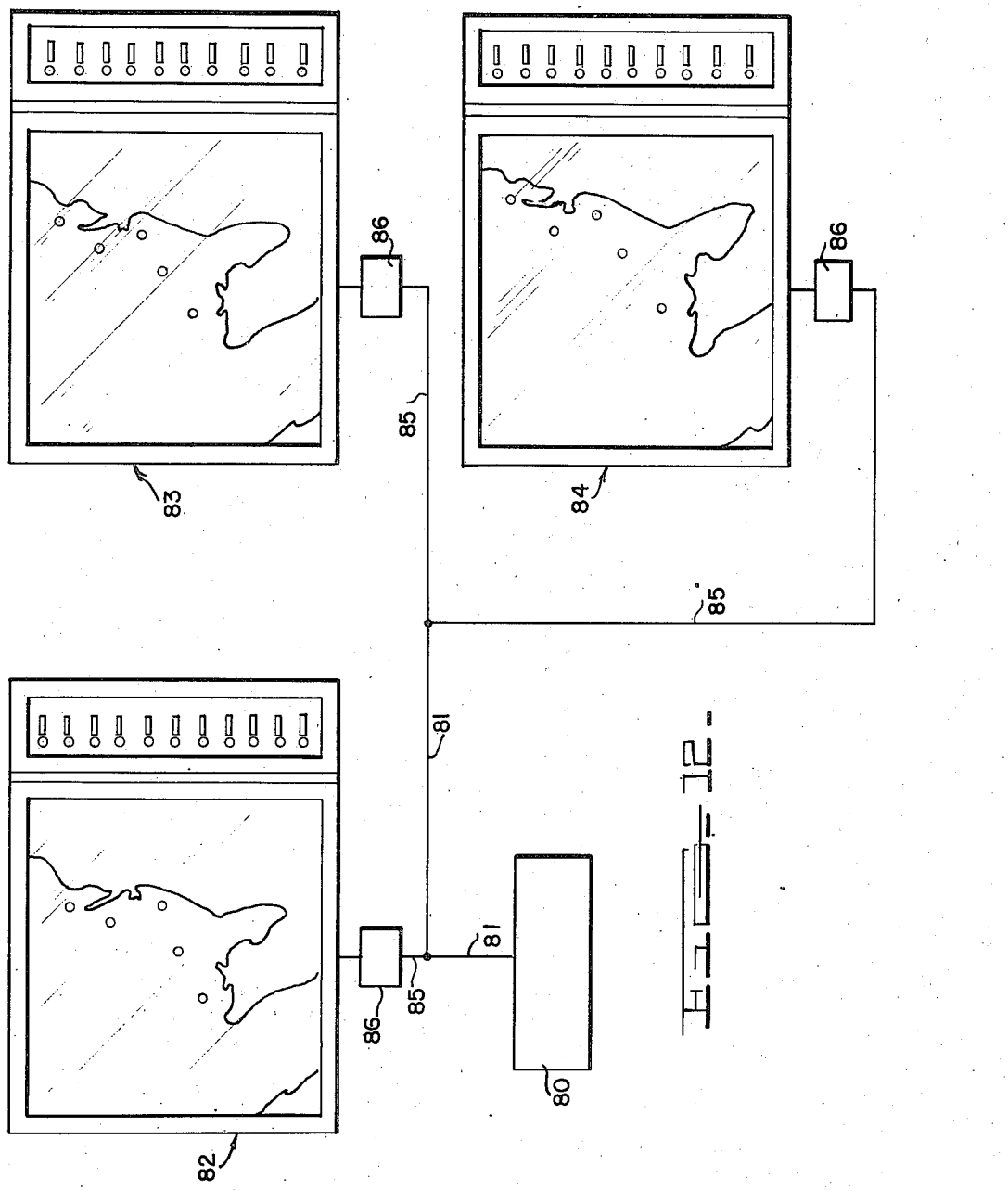

Patented Nov. 30, 1948

2,455,209

UNITED STATES PATENT OFFICE 2,455,209

APPARATUS FOR DISSEMINATING WEATHER INFORMATION

Joseph B. Anderson, Washington, D. C.

Application May 26, 1947, Serial No. 750,617

2 Claims. (Cl. 177—311)

This invention relates to weather maps and has more particular reference to weather maps incorporating visual indicating means for showing the present and/or future weather conditions at a plurality of stations on the map representing towns and cities.

One object of the present invention is to provide a weather map having a plurality of stations representing towns or cities outlined thereon and provided with means for visually indicating at each station the present or forecasted weather conditions of the station.

Another object of the present invention is to provide a weather map, as characterized above, in which the indicating means include movable members employing various colors, symbols and indicia to indicate specific weather conditions.

Another object of the invention is to provide a weather map, as characterized above, in which means are provided for illuminating the movable members to render them more readily visible.

Another object of the present invention is to provide a weather map, as characterized above, in which the movable members are in the form of cylinders and are provided with means for step-by-step rotation by remote control.

A further object of the invention is to provide a plurality of weather maps, as characterized above, in which the movable members are controlled and operated from a central control station.

A still further object of the invention is to provide a system for disseminating weather information at a plurality of remotely separated receiving stations which are controlled and operated by remote control from a central transmitting station.

Other objects and advantages of the invention will be apparent in the specification when considered with the accompanying drawings, wherein:

Fig. 1 is a perspective view of a weather map constructed in accordance with the present invention;

Fig. 2 is an elevational view of one form of indicator, showing the manner in which it is mounted;

Fig. 3 is a plan view of the indicator shown in Fig. 2;

Fig. 4 is a fragmentary view taken from the rear of the weather map, showing the mechanism for operating the indicator shown in Fig. 2;

Fig. 5 is a fragmentary elevational view showing the interior of the panel portion of the weather map;

Fig. 6 is an elevational view, with parts broken away, of a modified form of indicator;

Fig. 7 is a plan view of the indicator shown in Fig. 6, but with the top of the frame removed;

Fig. 8 is an enlarged fragmentary vertical sectional view showing the manner in which the lamp is mounted within the weather ring shown in Fig. 6;

Fig. 9 is a detailed view of the lamp and its mounting.

Fig. 10 is a fragmentary elevational view showing a portion of the interior of the cabinet and the manner in which the indicator shown in Fig. 6 is mounted thereon;

Fig. 11 is a fragmentary vertical sectional view of the cabinet showing a side elevation of the indicator mounting shown in Fig. 10; and Fig. 12 is a diagrammatic view showing a system for operating a plurality of weather maps from a single transmitting station.

The present invention constitutes an improvement over the weather map disclosed in my Patent No. 1,884,500, issued on October 25, 1932, for Map.

In the present invention the translucent panel on which the map is outlined and the cabinet in which it is mounted, may be similar to that shown in the aforesaid patent. However, the mechanism for indicating weather conditions at the various stations on the map comprises novel and greatly improved means for showing a far larger number of specific weather conditions.

In general, the present invention comprises the use of movable indicators employing various colors, symbols and other indicia to indicate specific weather conditions existing at the stations outlined on the map. The indicators may be operated either mechanically or electrically. The present invention further contemplates the use of a plurality of weather maps employing electrically operated indicators which may be controlled from a central remotely located station. In such a system, the central control station may be located, for example, in New York city, for singly or simultaneously controlling and operating the indicators on weather maps located, for example, in Baltimore, Philadelphia, Washington, etc., in a manner similar to the operation of stock market quotation systems.

Referring to the drawings, there is shown in Fig. 1, a weather map constructed in accordance with the invention and shown in the form of a rectangular cabinet member 10. The front of the cabinet has hingedly secured thereto a map frame 11, in which is suitably mounted a plate or panel member 12 on which is sketched, painted, or printed, a map 13 of a country or section thereof. The location of various towns and cities that transmit weather reports may be indicated by circles 14 with the name of the places indicated in close proximity to the circles. The plate 12 may be either translucent or opaque; in the latter event, the areas enclosed within the circles 14 are either cut away to form openings, or are made either translucent or transparent. In the particular embodiment shown, the plate 12 is preferably made of a translucent plastic material.

A panel member 15 is hingedly secured to the opposite end of the cabinet and is separated from the map frame by means of a vertical cross strip 16. The panel 15 is provided with a plurality of vertically aligned translucent circular areas 17, each having a weather indicating designation formed thereon, such as coloring, letters, symbols, numbers, or a combination thereof, the meaning of which is indicated by indicia 18. These weather indicating designations correspond to the weather indicating designations which are shown at the station circles to indicate the various types of weather as hereinafter explained. Suitable means may be provided for keeping the map frame and panel in a closed position.

Mounted within the cabinet 10 behind the panel 15 are a plurality of lights 19, each light being positioned in alignment with a translucent area 17. The lights 19 are connected to wires 20 which, in turn, are suitably connected to a source of electric current (not shown). When the map is in operation, the lights burn constantly and shine through the translucent areas 17.

Mounted on the rear wall 21 of the cabinet 10 are a plurality of indicator units 22. One indicator unit is provided for each of the station circles 14 and is mounted on the rear wall of the cabinet in a position in horizontal alignment with its corresponding station circle.

Each of the indicator units is identical in construction, the details of which are shown in Figs. 2 and 3. As there shown, a weather ring or drum 23 is detachably secured at its lower periphery, as by friction fit, to a disc 24 which is fixedly mounted on a vertical shaft 25 suitably journalled, as indicated at 26, 27, in a U-shaped frame 28 fixedly attached to a mounting block 29, which, in turn, is suitably secured to the rear wall 21 of the cabinet.

The shaft 25 has a gear 30 fixedly mounted thereon and engaging a gear 31 fixedly mounted on a shaft 32, which is journalled adjacent one end in an upstanding lug 33 formed on the lower arm of the U-shaped frame 28. The other end of the shaft 32 projects through suitable aligned openings formed in the mounting block 29 and the rear wall of the cabinet, and has a knurled knob 34 and a resilient indicating arm 35 fixedly mounted thereon. The outer end 36 of the resilient indicating arm 35 is bent inwardly for a purpose to be hereinafter explained.

The weather ring or drum 23 is made of a transparent or translucent material, preferably a plastic material, and its outer circumferential surface is divided into a plurality of areas or frames of a particular shape, which may be colored and carry indicia to indicate a particular state of weather, temperature, ceiling, wind velocity, or any other weather information. In the particular embodiment shown, the weather ring is divided into eleven identical rectangular areas or frames. One of the areas is made opaque, the remaining areas are colored and may be provided with certain letters, symbols, or numbers, each of which is appropriate to describe a specific weather condition, such as rain, snow, frost, temperature, wind direction, and velocity, etc. For example, a red colored area with an R may indicate rain; a red colored area with a T may indicate thunder storms; and a green colored area without a symbol may indicate fair, clear weather.

As shown in Fig. 4, a pilot ring 37 is mounted on the back of the rear wall 21 of the cabinet concentric with the shaft 32, and is divided into eleven areas corresponding in coloring and indicia to the areas on the weather ring 23. A recess 38 is formed in each of the areas on the pilot ring to receive the inturned end 36 of the indicating arm 35. When the indicator units are mounted on the rear wall of the cabinet, the weather rings are spaced slightly from the rear surface of the map panel and each weather ring is positioned to have one of the areas outlined thereon in horizontal alignment with its corresponding station circle. Obviously, the station circle may be omitted, if considered desirable.

The positioning of the areas of the pilot ring, the ratio of gearing of the gears 30, 31, and the spacing of the recesses 38 is such that, when the indicating arm 35 is moved to an area in the pilot ring, the weather ring will be rotated to bring the corresponding area thereon into alignment with the station circle behind which it is located. The recesses 38 act as detents to hold the indicating arm and prevent its accidental movement.

In order to make the areas of the weather rings which are in alignment with their respective station circles more readily visible from the front of the map, means may be provided for illuminating these areas. This is particularly desirable when the areas within the station circles are translucent. In this instance, this is preferably accomplished by projecting light rays onto these areas. For this purpose, each indicator unit may be provided with an arm 39 hingedly mounted on the upper end of the mounting block 29 and carrying a light 40 mounted within a parabolic reflector 41 fixedly attached to the underside of the free end of the arm 39. The reflector is so positioned as to reflect the light of the lamp on the area of the weather ring directly aligned with the station circle. When the light bulb burns out, the arm 39 may be swung upwardly to permit ready replacement of the bulb.

The operation of the weather map is as follows:

An operator at the rear of the cabinet receives information as to the present or future (whichever is being exhibited) weather conditions at the cities or towns which are represented on the board by station circles, over telegraph, telephone, radio or other communication channels, and immediately sets the indicating pointer of each station to correspond with the weather conditions as reported existing in that city. Cities or towns from which no reports are received will have their weather rings turned to show the blank opaque area.

It is further contemplated, as a part of this invention, that the indicating units which carry the weather rings be operated electrically with a step-by-step motion, employing Selsyn motors or electro-magnetically operated ratchet mechanisms, or the like.

In Figs. 6 and 7, there is shown a modification of the indicator unit which is electro-magnetically operated. As here shown, the electro-magnetic means for rotating the weather ring is similar in construction and operation to that shown in U. S. Patent No. 2,049,499, issued to M. L. Haselton for an Indicator, on August 4, 1936. In this particular modification, each of the electro-magnetically operated indicator units is identical in construction and each comprises a U-shaped frame member 42 having top and bottom walls 43, 44 held spaced apart by posts 45. A weather ring 46 is fixedly secured along its upper circumferential periphery to a disc 47 fixedly mounted on a vertical shaft 48 suitably journalled in the top and bottom walls of the U-shaped frame. The weather ring is similar in construction to the weather ring 23 and has its outer circumferential surface divided into eleven equal areas, one of which is made opaque with the remainder being translucent and colored and carrying symbols similar to the ring 23.

The mechanism for operating the weather ring or drum is constructed in accordance with the disclosure in said Haselton patent and comprises a ratchet wheel 49 fixedly mounted on the shaft 48 and operated by an operating fork 50 suitably mounted on one of the posts 45 and provided with a right angular armature portion 51. A magnet 52 is suitably secured in the end wall of the frame 42 and is provided with a core cooperating with the armature portion 51 of the fork 50. When the magnet is energized the operating fork 50 will be moved to turn the ratchet wheel 49 and, upon de-energization of the magnet, the operating fork will be restored to its normal position by means of a spring 53, which is secured to the operating fork and to a suitable and preferably adjustable member 54 mounted on the frame 42. The construction of the parts is such that the movements of the fork by the energization of the magnet, and the spring 53, will rotate the weather ring to display the next indicia area. The drum is held in position after each such movement by a spring pawl 55 secured to the upper wall 43 of the frame and having its free end cooperating with holes 56 formed in a circular series in a disc 57 fixedly attached to the shaft 48. The number of holes 56 is equal to twice the number of teeth on the ratchet wheel 49.

As shown in said Haselton patent, the magnet 52 may be successively energized over a circuit including a slip connection 58, brush 59, commutator 60, the shaft 48, and spring clip connection 61, to a ground on the board on which the indicating unit is mounted, until the weather ring displays the blank or opaque area through an aperture 62 formed in a mask 63 mounted on the outer end of the frame. When it is desired to set up the weather ring to show a new set up, the operating circuit will include the slip connection 58, brush 59, and commutator 60, brush 64 and slip connection 65 which is connected to ground during the setting up operation.

In order to render more readily visible the colored area of the weather ring which is aligned with the opening 62 in the mask 63, a lamp and reflector may be mounted within the weather ring. In this instance, a lamp 66 is mounted within a parabolic reflector 67, which is adjustably secured to the upturned end 68 of a bracket member 69 suitably secured, as by welding, to one of the posts 45 of the frame. The electrical connections 70 from the lamp 66 terminate in slip connections 71, 72 for a purpose to be hereinafter described.

Means are provided for mounting the indicator units on the inner surface of the rear wall of the cabinet so that each indicator unit will be positioned behind a corresponding station circle with the opening 62 in the mask 63 in horizontal alignment with the station circle.

In this instance, as shown in Figs. 10 and 11, each indicating unit is mounted on the inner face of the rear wall of the cabinet by means of a channel-shaped supporting member 73, suitably secured to the rear wall of the cabinet, as by welding. An insulated female contact member 74 is secured to the rear end of the bracket for engagement with the indicator unit slip connections or terminal contacts 58 and 65. An insulated female contact member 75 is secured to the rear end of the bracket for engagement with the lamp terminal slip connections 71, 72.

An upper bracket 76, suitably secured to the rear wall 21 of the cabinet is positioned above the channel-shaped bracket 73 and carries a resilient ground contact member 77 adapted to engage the spring clip connection 61 on the indicator frame. The wires from the female contact members 74 are led from the bottom of the cabinet and are preferably connected to a suitable selector mechanism (not shown). The wires from the lamp connection female contact members 75 are connected in parallel to wires 78, 79 which are connected to the wires 20 located behind the panel member 15.

With the above described mounting construction, each of the indicator units may be readily slid into or out of its channel-shaped supporting bracket independently of the others, to facilitate inspection, repair, or replacement.

While the electro-magnetically operated weather indicators may be individually operated by remote control, in any well known manner, it is further contemplated, as a part of this invention, that a plurality of weather maps be simultaneously operated by remote control from a central transmitting station. The electro-magnetic indicators may be operated from the remote central control station in a manner similar to that commonly employed in the operation of stock quotation boards, such as shown in the following U. S. patents: Hazelton, No. 1,890,876, dated December 13, 1932; Hazelton, No. 1,890,877, dated December 13, 1932; Scheidegger, No. 1,958,208, dated May 8, 1934; Hazelton, No. 2,067,187, dated January 12, 1937.

Such an arrangement is shown diagrammatically in Fig. 12. As there shown, a central transmitting station 80, located, for example, in New York city, sends electrical impulses over a communication channel, such as a transmission line 81. Weather maps 82, 83 and 84, located, for example, in Philadelphia, Baltimore and Washington, are connected to the line 81 by drop lines 85. Each of the drop lines 85 is connected to a selector box 86 which may include one or more well known selector mechanisms to which are connected the circuits from each of the weather indicators on the particular may controlled by the selector. The system is such that an operator at the central control station may simultaneously operate the corresponding station indicators on each of the weather maps 82, 83 and 84.

From the foregoing, it will be seen that there has been provided a weather map which may be mechanically or electrically operated to show on the map at a plurality of stations indicating cities and towns, any condition of present or future weather. In addition, the map, or a group of maps, may be controlled and operated as a system from a single remote control station. While, in the particular embodiment illustrated, only one indicator unit has been shown as being located behind each station circle, obviously, one or more of such units may be used for each station, depending upon the number and types of different weather conditions desired to be shown simultaneously.

Obviously, the invention is not restricted to the particular embodiments thereof herein shown and described. Moreover, it is not indispensible that all of the features of the invention be used conjointly since they may be employed advantageously in combinations and sub-combinations.

What is claimed is:

1. A weather map comprising a panel member having a map associated therewith, said panel having a plurality of areas located thereon permitting vision therethrough and each designating a particular locality on the map; a plurality of weather indicating units mounted behind said panels, each of said weather indicating units positioned behind one of said areas designating a particular locality, each of said weather indicating units including a rotatably mounted weather ring having a plurality of weather indicating designations formed thereon, said designations being formed by dividing the circumferential surface of said ring into a plurality of frames, with each frame colored a color selected from a group of various colors, frames of the same color bearing different indicia, whereby the frames indicate particular states of weather and specific weather conditions; each of said weather rings being mounted in position behind its area, so that only one frame at a time registers with its area permitting its weather indication to be seen from the front of the panel; and separate operating mechanism for rotating each of said weather rings to bring any selected one of its frames into registry with its area and thereby show a particular state and specific condition of the weather of the locality behind which the weather ring is positioned.

2. A weather map as set forth in claim 1, wherein each of said areas and each of said weather rings are translucent and wherein a lamp and a reflector is mounted within each of said weather rings with the reflector positioned to project the light rays on the particular frame of the weather ring underlying the area behind which the weather ring is mounted, thereby causing the weather indication to be so illuminated that it will be clearly visible from in front of the panel.

JOSEPH B. ANDERSON.

REFERENCES CITED

The following references are of record in the file of this patent:

UNITED STATES PATENTS

| Number | Name | Date |
|---|---|---|
| 386,189 | Delany | July 17, 1888 |
| 655,264 | Nichol | Aug. 7, 1900 |
| 1,580,286 | Cloud | Apr. 13, 1926 |
| 1,958,208 | Scheidegger | May 8, 1934 |
| 1,960,781 | Hershey | May 29, 1934 |
| 2,074,066 | Wheeler et al. | May 29, 1934 |
| 2,417,043 | Blewett et al. | Mar. 11, 1947 |